(12) United States Patent
Raniere

(10) Patent No.: US 9,854,439 B2
(45) Date of Patent: Dec. 26, 2017

(54) DEVICE AND METHOD FOR AUTHENTICATING A USER OF A VOICE USER INTERFACE AND SELECTIVELY MANAGING INCOMING COMMUNICATIONS

(71) Applicant: FIRST PRINCIPLES, INC., Albany, NY (US)

(72) Inventor: Keith A Raniere, Clifton Park, NY (US)

(73) Assignee: FIRST PRINCIPLES, INC., Albany, NY (US)

( * ) Notice: Subject to any disclaimer, the term of this patent is extended or adjusted under 35 U.S.C. 154(b) by 80 days.

(21) Appl. No.: 14/175,209

(22) Filed: Feb. 7, 2014

(65) Prior Publication Data

US 2015/0229756 A1   Aug. 13, 2015

(51) Int. Cl.
  *H04M 1/00* (2006.01)
  *H04W 12/06* (2009.01)
  *H04M 1/725* (2006.01)

(52) U.S. Cl.
  CPC ....... *H04W 12/06* (2013.01); *H04M 1/72522* (2013.01); *H04M 2250/74* (2013.01)

(58) Field of Classification Search
  USPC .... 455/412.2, 413, 415, 418, 466, 457, 567, 455/569.1 B, 569.2
  See application file for complete search history.

(56) References Cited

U.S. PATENT DOCUMENTS

| | | |
|---|---|---|
| 5,991,799 A | 11/1999 | Yen et al. |
| 6,366,651 B1 | 4/2002 | Griffith et al. |
| 6,668,278 B1 | 12/2003 | Yen et al. |
| 6,721,729 B2 | 4/2004 | Nguyen et al. |
| 6,834,107 B1 * | 12/2004 | Hurst ................. H04M 1/6016 379/373.01 |
| 6,895,257 B2 | 5/2005 | Boman et al. |
| 6,968,333 B2 | 11/2005 | Abbott et al. |
| 7,027,804 B2 * | 4/2006 | Mufti ................ H04M 1/72519 379/388.02 |
| 7,072,948 B2 | 7/2006 | Yen et al. |
| 7,130,401 B2 | 10/2006 | Rampey et al. |
| 7,136,462 B2 | 11/2006 | Pelaez et al. |
| 7,155,451 B1 | 12/2006 | Torres |
| 7,219,136 B1 | 5/2007 | Danner et al. |
| 7,231,439 B1 | 6/2007 | Abbott et al. |

(Continued)

OTHER PUBLICATIONS

Office Action for U.S. Appl. No. 14/174,986 (filed Feb. 7, 2014), dated Feb. 26, 2016.

(Continued)

*Primary Examiner* — Dai A Phuong
(74) *Attorney, Agent, or Firm* — Schmeiser, Olsen & Watts, LLP

(57) ABSTRACT

A receiver coupled to a processor for receiving an electronic communication from a separate computing device, a local storage medium coupled to the processor, the local storage medium storing an identification system for identifying the electronic communication received from the separate computing device, and a voice user interface coupled to the processor for receiving a voice communication from the user without a physical interaction between the user and the computing device is provided. Associated methods are also provided.

10 Claims, 5 Drawing Sheets

(56) References Cited

U.S. PATENT DOCUMENTS

| | | |
|---|---|---|
| 7,236,580 B1 | 6/2007 | Sarkar et al. |
| 7,489,767 B2 | 2/2009 | Hikishima |
| 7,512,678 B2 | 3/2009 | Crabtree et al. |
| 7,512,889 B2 | 3/2009 | Newell et al. |
| 7,577,665 B2 | 8/2009 | Ramer et al. |
| 7,596,591 B2 | 9/2009 | Titmuss |
| 7,664,734 B2 | 2/2010 | Lawrence et al. |
| 7,689,919 B2 | 3/2010 | Abbott et al. |
| 7,702,318 B2 | 4/2010 | Ramer et al. |
| 7,769,757 B2 | 8/2010 | Grefensette et al. |
| 7,792,253 B2 | 9/2010 | Agapi et al. |
| 7,818,179 B2 | 10/2010 | Krasikov et al. |
| 7,848,265 B2 | 12/2010 | Levy et al. |
| 8,013,734 B2 | 9/2011 | Saigh et al. |
| 8,020,104 B2 | 9/2011 | Robarts et al. |
| 8,103,665 B2 | 1/2012 | Abbott et al. |
| 8,150,024 B1* | 4/2012 | Martin .............. H04M 3/42017 379/22.08 |
| 8,442,969 B2 | 5/2013 | Gross |
| 8,676,904 B2 | 3/2014 | Lindahl |
| 8,719,198 B2 | 5/2014 | Zheng et al. |
| 8,903,759 B2 | 12/2014 | King et al. |
| 9,203,979 B1* | 12/2015 | Jaccino .............. H04M 19/04 |
| 9,454,918 B1* | 9/2016 | Hlatky, Jr. .............. G09B 5/06 |
| 2002/0076033 A1* | 6/2002 | Baweja .............. H04M 19/044 379/373.01 |
| 2002/0191778 A1* | 12/2002 | Che .............. H04M 1/72513 379/393 |
| 2004/0176114 A1 | 9/2004 | Northcutt |
| 2004/0267527 A1 | 12/2004 | Creamer et al. |
| 2005/0033867 A1 | 2/2005 | Hong et al. |
| 2005/0198026 A1 | 9/2005 | Dehlinger et al. |
| 2005/0243975 A1 | 11/2005 | Reich et al. |
| 2005/0266829 A1 | 12/2005 | Tran et al. |
| 2005/0282590 A1* | 12/2005 | Haparnas .............. H04M 19/044 455/570 |
| 2006/0093098 A1 | 5/2006 | Tarn |
| 2007/0140471 A1* | 6/2007 | Gutta .............. H04M 1/6016 379/392.01 |
| 2007/0192318 A1 | 8/2007 | Ramer et al. |
| 2008/0170683 A1* | 7/2008 | Zernovizky .......... H04M 19/044 379/418 |
| 2008/0250026 A1 | 10/2008 | Linden et al. |
| 2009/0012944 A1 | 1/2009 | Rodriguez et al. |
| 2010/0211389 A1 | 8/2010 | Marquardt |
| 2010/0330964 A1* | 12/2010 | Chen .............. H04M 1/57 455/412.1 |
| 2011/0034156 A1* | 2/2011 | Gatti .............. H04M 1/2745 455/415 |
| 2011/0135086 A1* | 6/2011 | Sun .............. H04M 1/6016 379/392.01 |
| 2011/0201385 A1 | 8/2011 | Higginbotham |
| 2011/0289224 A1* | 11/2011 | Trott .............. H04L 65/4038 709/227 |
| 2012/0023226 A1 | 1/2012 | Petersen et al. |
| 2012/0064917 A1 | 3/2012 | Jenkins et al. |
| 2012/0269116 A1 | 10/2012 | Xing et al. |
| 2012/0322510 A1* | 12/2012 | Epley .............. H04M 19/044 455/567 |
| 2014/0072137 A1* | 3/2014 | Nelson .............. H04R 1/1041 381/74 |
| 2014/0187225 A1* | 7/2014 | Miller .............. H04L 12/1818 455/418 |
| 2015/0340042 A1* | 11/2015 | Sejnoha .............. H04M 1/72519 704/275 |
| 2015/0365759 A1 | 12/2015 | Dimitriadis et al. |

OTHER PUBLICATIONS

Final Office Action for U.S. Appl. No. 14/174,986 (filed Feb. 7, 2014), dated Oct. 5, 2016.

Office Action for U.S. Appl. No. 14/174,986 (filed Feb. 7, 2014), dated Apr. 6, 2017.

Office Action for U.S. Appl. No. 14/030,595 (filed Sep. 18, 2013), dated May 21, 2015.

Final Office Action for U.S. Appl. No. 14/030,595 (filed Sep. 18, 2013), dated Dec. 11, 2015.

Office Action for U.S. Appl. No. 14/030,595 (filed Sep. 18, 2013), dated Nov. 9, 2016.

Final Office Action for U.S. Appl. No. 14/030,595 (filed Sep. 18, 2013), dated Jun. 16, 2017.

International Search Report for PCT Application No. PCT/US16/36895, dated Aug. 31, 2016.

* cited by examiner

DEVICE AND METHOD FOR AUTHENTICATING A USER OF A VOICE USER INTERFACE AND SELECTIVELY MANAGING INCOMING COMMUNICATIONS

FIELD OF TECHNOLOGY

The following relates to the field of telecommunications and more specifically to embodiments of a device, system, and method for conducting real time messaging using speech-to-text conversion that can identify, prioritize, and authenticate incoming communications and voice commands.

BACKGROUND

Current telecommunications systems that include speech-to-text capabilities are inaccurate and cannot be customized to perform certain functions automatically. These devices require a physical interaction with the device to perform certain desired functions. Often times, any individual can access and set the device to perform functions, including speech-to-text conversion of voice commands. For instance, current speech-to-text devices do not customize themselves based on the primary user(s), nor can they automatically authenticate the user based purely on the speech being produced by the user. Furthermore, current telecom devices are not selective when performing various functions of the device, such as selectively managing/allowing incoming messages.

Thus, a need exists for a device, system, and method for speech-to-text communication that allows users to authorize, prioritize and customize speech-to-text functionality by identifying the user's vocal signature and selectively managing incoming communications.

SUMMARY

A first aspect relates to a computing device comprising: a receiver coupled to a processor for receiving an electronic communication from a separate computing device, a local storage medium coupled to the processor, the local storage medium storing an identification system for identifying the electronic communication received from the separate computing device, wherein the processor notifies a user of the identified information of the electronic communication, and a voice user interface coupled to the processor for receiving a voice communication from the user in response to the notifying of the identified information, without a physical interaction between the user and the computing device, wherein the processor determines an action based on the voice communication.

A second aspect relates to a computing device comprising: a receiver coupled to a processor for receiving an electronic communication from a separate computing device, and a local storage medium coupled to the processor, the local storage medium storing an identification system for identifying the electronic communication received from the separate computing device, and a priority database that contains a priority level specific to a source of the identified information, wherein, in response to the receiving the electronic communication from the separate computing system, the processor accesses the priority database, and if the priority level equals or exceeds a pre-determined value, a user is notified by the processor that the electronic communication is being received, and if the priority level is below the pre-determined value, the user is not notified that the electronic communication is being received from the separate computing device.

A third aspect relates to a computing device comprising: a voice user interface coupled to a processor for receiving a voice communication from a user and converting the voice communication into a computer readable data, without a physical interaction between the user and the computing device, a local storage medium coupled to the processor, the local storage medium storing an authentication system for analyzing the computer readable data to authenticate a voice signature of the user communication with the computing device, and a transmitter for transmitting the computer readable data to a separate computing device if the voice signature is authenticated.

A fourth aspect relates to a method comprising: receiving, by a processor of the computing device, an electronic communication from a separate computing device, identifying, by the processor, the electronic communication received from the separate computing device, notifying, by the processor, the identified information of the electronic communication, receiving, through a voice user interface coupled to the processor, a voice communication from a first user in response to the notifying of the identified information, without a physical interaction with the computing device, and determining, by the processor, an action based on the voice communication.

A fifth aspect relates to a method comprising: receiving, by a processor of a computing device, an electronic communication from a separate computing device, identifying, by the processor, the electronic communication received from the separate computing device; and accessing, by the processor, a priority database to determine a priority level specific to a source of the identified information, in response to receiving the electronic communication from the separate computing system, wherein, if the priority level equals or exceeds a pre-determined value, a user is notified by the processor that the electronic communication is being received, wherein, if the priority level is below the pre-determined value, the user is not notified that the electronic communication is being received from the separate computing device.

BRIEF DESCRIPTION OF THE DRAWINGS

Some of the embodiments will be described in detail, with reference to the following figures, wherein like designations denote like members, wherein.

DETAILED DESCRIPTION

A detailed description of the hereinafter described embodiments of the disclosed system and method are presented herein by way of exemplification and not limitation with reference to the Figures. Although certain embodiments of the present invention will be shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

An a preface to the detailed description, it should be noted that, as used in this specification and the appended claims, the singular forms "a", "an" and "the" include plural referents, unless the context clearly dictates otherwise.

Figure 1:
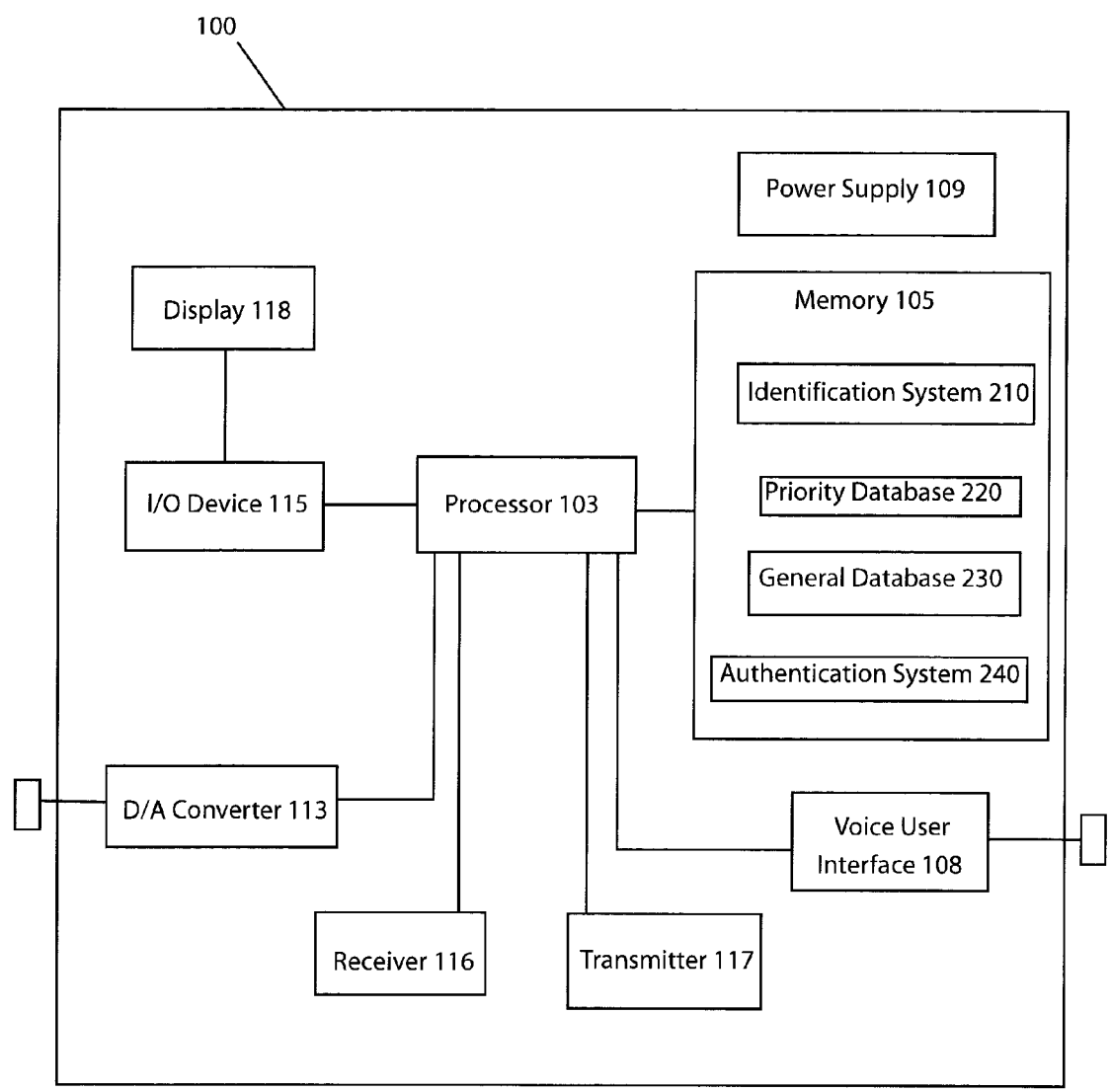
FIG. 1 depicts a schematic view of an embodiment of a computing device.
Figure 2:
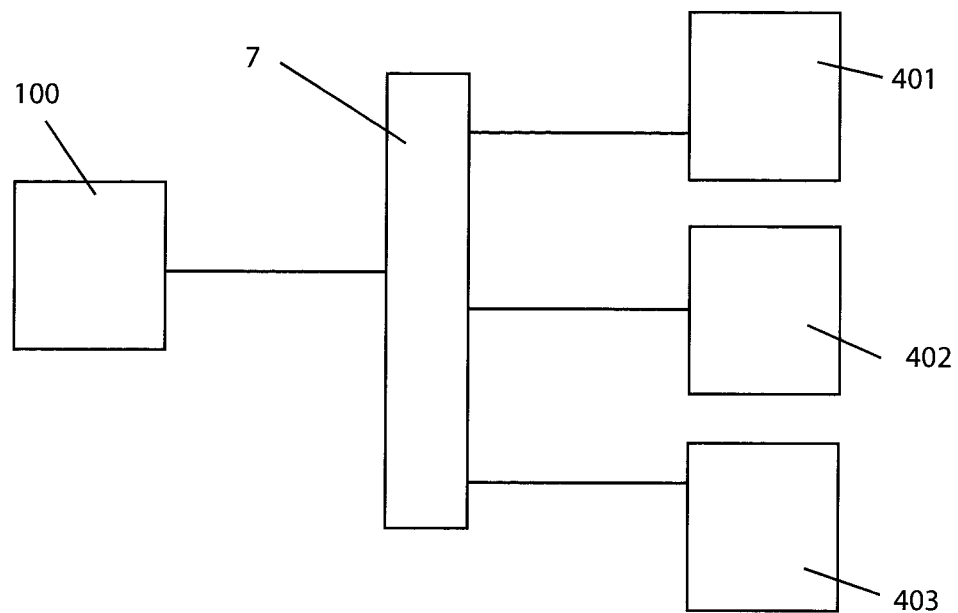
FIG. 2 depicts a schematic view of an embodiment of the computing device connected to other computing devices over a network.

FIG. 1 depicts an embodiment of a computing device 100. A computer device 100 may comprise any device or apparatus which may contain a processor 103, a local storage medium, such as computer readable memory 105, and an input and output interface 115. Embodiments of computing device 100 may be desktop computers, laptops, tablets, chromebooks, smartphones or other mobile or cellular phones, internet connected televisions, video game consoles, smart appliances, media player devices such as an iPod® or iPod-like devices, and media devices integrated with automobiles. Embodiments of computing device 100 may further include a display 118 for displaying content to a user, a digital-to-analog converter 113, a receiver 116, a transmitter 117, a power supply 109 for powering the computing device 100, and a voice user interface 108. Furthermore, embodiments of the computing device 100 may be a computing system or a component or part of a computing system, and may be configured to connect to the Internet and other computing devices over a network 7, as shown in FIG. 2. Embodiments of the network may be a cellular network, a Wi-Fi network, intranet, and the like.

Embodiments of processor 103 may be any device or apparatus capable of carrying out the instructions of a computer program. The processor 103 may carry out instructions of the computer program by performing arithmetical, logical, input and output operations of the system. In some embodiments, the processor 103 may be a central processing unit (CPU) while in other embodiments, the processor 103 may be a microprocessor. In an alternative embodiment of the computing system, the processor 103 may be a vector processor, while in other embodiments the processor may be a scalar processor. Additional embodiments may also include a cell processor or any other existing processor available. Embodiments of a computing device 100 may not be limited to a single processor 103 or a single processor type, rather it may include multiple processors and multiple processor types within a single system that may be in communication with each other.

Moreover, embodiments of the computing device 100 may also include a local storage medium 105. Embodiments of the local storage medium 105 may be a computer readable storage medium, and may include any form of primary or secondary memory, including magnetic tape, paper tape, punch cards, magnetic discs, hard disks, optical storage devices, flash memory, solid state memory such as a solid state drive, ROM, PROM, EPROM, EEPROM, RAM, DRAM. Embodiments of the local storage medium 105 may be computer readable memory. Computer readable memory may be a tangible device used to store programs such as sequences of instructions or systems. In addition, embodiments of the local storage medium 105 may store data such as programmed state information, and general or specific databases. For instance, embodiments of the local storage medium 105 may include, contain, store, or otherwise include an identification system 210, a priority database 220, a general database 230, and an authentication system 240. Embodiments of the identification system 210, the priority database 220, and the authentication system 240 are described in greater detail infra. Moreover, the local storage medium 105 may store programs or data on a temporary or permanent basis. In some embodiments, the local storage medium 105 may be primary memory while in alternative embodiments, it may be secondary memory. Additional embodiments may contain a combination of both primary and secondary memory. Although embodiments of computing device 100 are described as including a local storage medium, it may also be coupled over wireless or wired network to a remote database or remote storage medium that contains embodiments of the identification system 210, the priority database 220, the general database 230, and the authentication system 240.

Moreover, embodiments of local storage medium 105 may be primary memory that includes addressable semiconductor memory such as flash memory, ROM, PROM, EPROM, EEPROM, RAM, DRAM, SRAM and combinations thereof. Embodiments of a computing device 100 that includes secondary memory may include magnetic tape, paper tape, punch cards, magnetic discs, hard disks, and optical storage devices. Furthermore, additional embodiments using a combination of primary and secondary memory may further utilize virtual memory. In an embodiment using virtual memory, a computing device 100 may move the least used pages of primary memory to a secondary storage device. In some embodiments, the secondary storage device may save the pages as swap files or page files. In a system using virtual memory, the swap files or page files may be retrieved by the primary memory as needed.

Referring still to FIG. 1, embodiments of computing device 100 may further include an input/output (I/O) interface 109. Embodiments of the I/O interface 109 may act as the communicator between computing device 100 and the world outside of the computing device 100. Inputs may be generated by users such as human beings or they may be generated by other computing systems. Inputs may be performed by an input device while outputs may be received by an output device from the computing device 100. Embodiments of an input device may include one or more of the following devices: a keyboard, mouse, joystick, control pad, remote, trackball, pointing device, touchscreen, light pen, camera, camcorder, microphone(s), biometric scanner, retinal scanner, fingerprint scanner or any other device capable of sending signals to a computing device/system. Embodiments of output devices may be any device or component that provides a form of communication from the computing device 100 in a human readable form. Embodiments of a computing device 100 that include an output device may include one or more of the following devices: displays, smartphone touchscreens, monitors, printers, speakers, headphones, graphical displays, tactile feedback, projector, televisions, plotters, or any other device which communicates the results of data processing by a computing device in a human-readable form.

With continued reference to FIG. 1, embodiments of computing device 100 may include a receiver 116. Embodiments of a receiver 116 may be a device or component that can receive radio waves and other electromagnetic frequencies and convert them into a usable form, such as in combination with an antenna. The receiver 116 may be coupled to the processor of the computing device 100.

Embodiments of the receiver 116 coupled to the processor 103 may receive an electronic communication from a separate computing device 401, 402, 403 over a network 7.

Moreover, embodiments of the computing device 100 may include a voice user interface 108. Embodiments of a voice user interface 108 may be a speech recognition platform that can convert an analog signal or human voice communication/signal to a digital signal to produce a computer readable format in real-time. One example of a computer readable format is a text format. Embodiments of the voice user interface 108 may continually process incoming audio, programmed to recognize one or more triggers, such as a keyword or command by the user operating the computing device 100. For example, embodiments of the voice user interface 108 coupled to the processor 103 may receive a voice communication from a user without a physical interaction between the user and the device 100. Because the voice user interface may continually process incoming audio, once the voice user interface 108 recognizes a trigger/command given by the user, the processor coupled thereto determines and/or performs a particular action. The continuous processing of audio may commence when the electronic communication is first received, or may be continuously processing audio so long as power is being supplied to the computing device 100. Furthermore, embodiments of the voice user interface 108 may continuously collect and process incoming audio through one or more microphones of the computing device 100. However, external or peripheral accessories that are wired or wirelessly connected to the computing device 100 may also collect audio for processing by the processor 103 of the computing device 100. Embodiments of the collected and processed audio may be the voice of the user of the computing device 100, and may have a variable range for collecting the audio.

Figure 3:
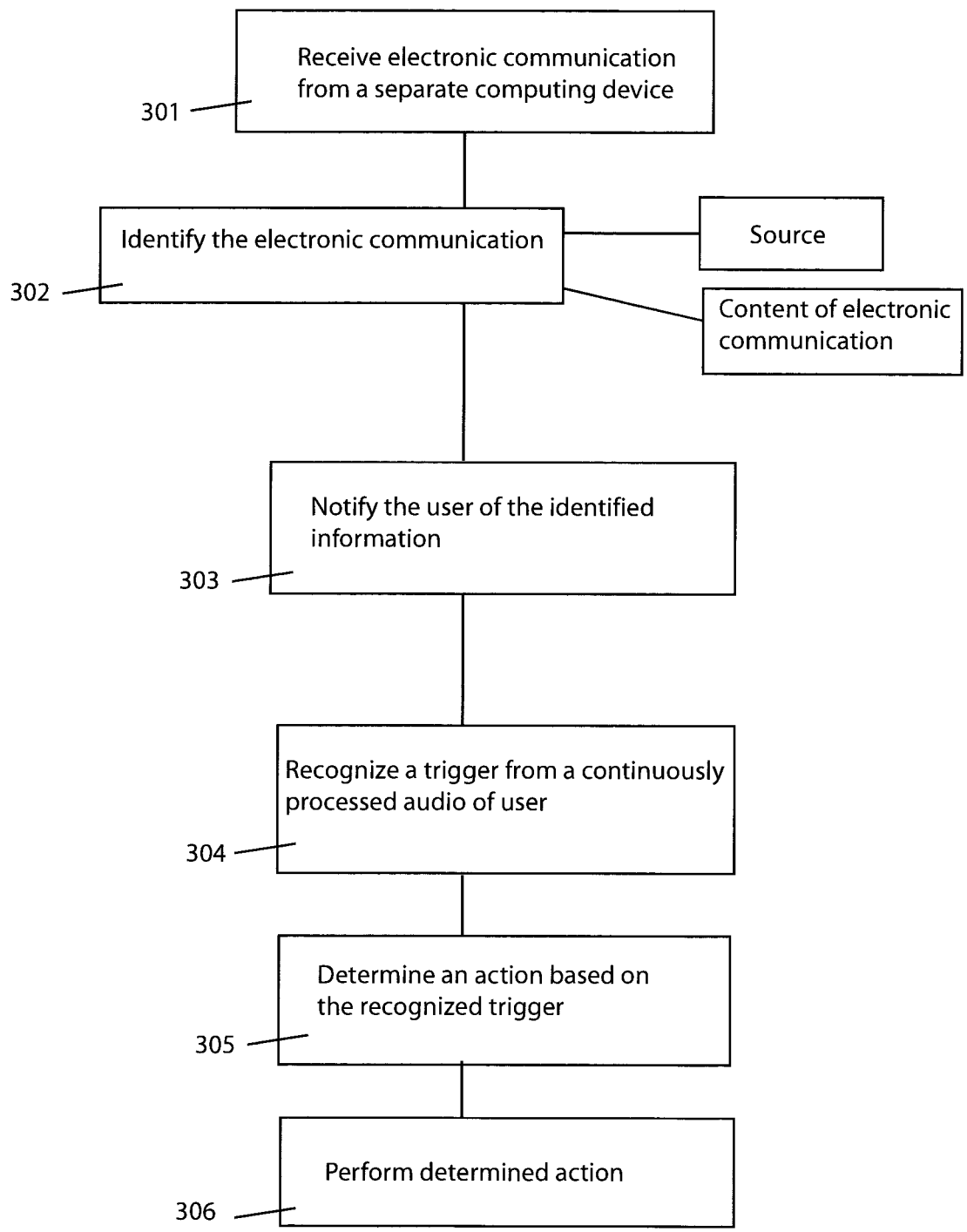
FIG. 3 depicts a flowchart of an embodiment of a computing device implementing a first embodiment of steps to selectively manage incoming communications.

FIG. 3 depicts an embodiment where a voice user interface 108 receives a voice communication in response to a notifying of identified information, without a physical interaction between the user and the computing device 100. In step 301, embodiments of the computing device 100 may receive an electronic communication from a separate computing device, such as computing device 401, 402, 403 over a network 7. For example, a user's cellular phone may receive a text message or a phone call from an acquaintance operating their cellular phone; the user's cellular phone may or may not indicate to the user that the electronic communication has initially been received. In step 302, embodiments of the computing device 100 may identify the received electronic communication. Embodiments of the computing device 100 may include an identification system 210 stored in a local storage medium 105 that may identify the electronic communication received by the computing device 100. For instance, when the electronic communication is received, the identification system 210 may determine and identify a source, a geographic location, a cellular phone number, a unique identifier, an identity, such as a known contact or available name, and other various characteristics of the electronic communication. In addition, the identification system 210 may parse the content of the incoming message, such as the text of a text message. Those having skill in the art should appreciate that various methods may be employed to identify the content, characteristics and other identifying information of the received electronic signal/communication. In step 303, the user may be notified of the identified information. For instance, if a known contact calls the user's cellular phone, the processor 103 of the computing device 100 may display or otherwise visually notify the name of the contact on the display 118 for the user.

In alternative embodiments, the computing device 100 may notify the user of the identified information by utilizing a speaker or D/A converter 113 of the computing device 100 to audibly notify the user. In step 304, embodiments of the voice user interface 108 may receive a voice communication from the user in response to the notifying of the identified information. The voice communication may be a command or keyword that is recognized by the voice user interface 108 as a trigger to perform an action. Embodiments of the computing device 100 may continuously process environmental audio or may begin continuously processing audio once an electronic communication is initially received by the receiver 116 of the computing device. Therefore, when the electronic communication is received, and the identification information is displayed to the user, the voice user interface 108 is processing audio for a recognized keyword, command, or trigger to perform a desired action. Examples of a recognized keyword or trigger may be: "send to voicemail," "answer call," "I am busy," "I will call back," and "send message [content of message]." In step 305, an action associated with the recognized trigger may be determined. In some embodiments, the computing device 100 may seek voice confirmation of the desired action from the user providing the command. In step 306, the determined action may be performed. Embodiments of actions determined by the processor 103 may be establishing a live communication channel between the computing device 100 and the separate computing device 401, and denying the live communication channel between the computing device 100 and the separate computing device 401. For example, if the user, in response to the displaying of the known contact, says "send him to voicemail," the computing device will process the received or incoming electronic communication to be forwarded to a voicemail system of the computing device 100. The user does not need to physically interact with the cellular phone for the phone to recognize and then process the voice communication from the user. However, if the command received, without physical interaction from user with the computing device 100, is a command to send or otherwise transmit a return electronic communication, then the voice user interface 108 may convert the user's voice command to computer readable form, such as text, and then transmit the message to the separate computing device 401, 402, 403 over network 7.

Figure 4:
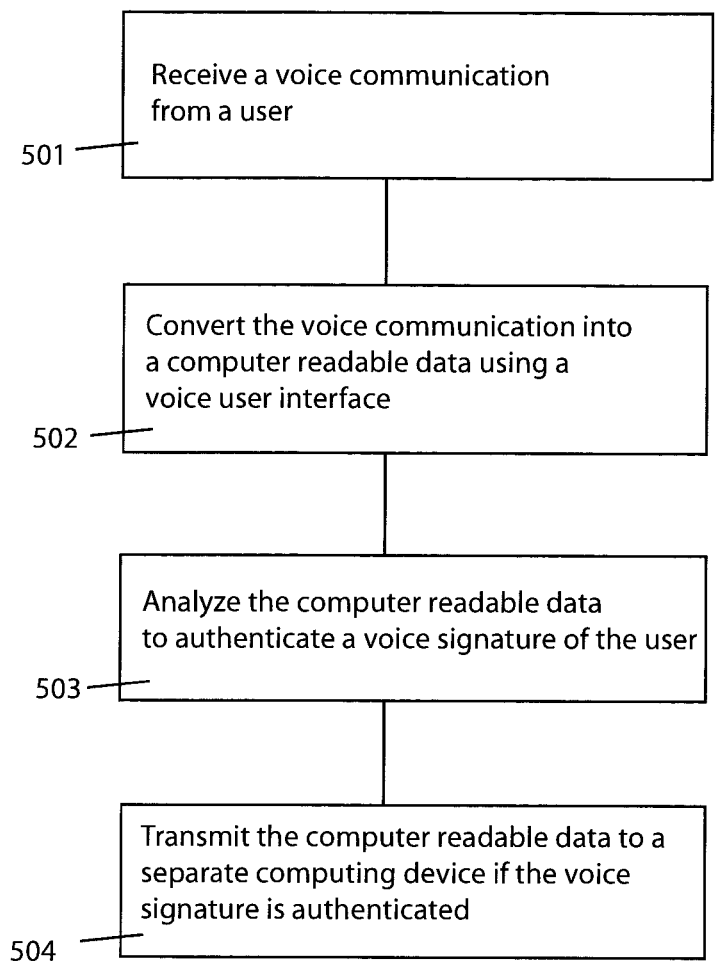
FIG. 4 depicts a flowchart of an embodiment of a computing device implementing a second embodiment of steps to selectively manage incoming communications.

FIG. 4 depicts an embodiment where a voice user interface 108 receives a voice communication for conversion into a computer readable form for transmitting to a separate computing device 401, 402, 403 over network 7, without a physical interaction between the user and the computing device 100. Further, embodiments of the computing device 100 may authenticate a voice signature of the voice communication before sending the message. In step 501, embodiments of the voice user interface 108 of the computing device 100 may receive a voice communication from a user. As explained above, the voice user interface 108 may be continuously monitoring, collecting, and processing surrounding audio. Thus, the user may, without physically operating the computing device 100, state a command or keyword that the voice user interface 108 recognizes a trigger to perform an action. For example, the user may say, "send message[message of content]" to have the computing device 100 send the message to a separate device. Moreover, each voice communication may contain a voice signature. A voice signature may be determined using a voice activity detection process, utilizing various algorithms to capture a specific voice signature of the user. The voice signature of the user may then be stored in a general database 230 located in the local storage medium 105. However, more than one voice signature may be captured and stored in the database 230. For instance, more than one person may be authorized to send messages or otherwise voice-operate the computing device 100. In step 502, embodiments of the voice user interface 108 may convert the voice communication into a computer readable format. In one embodiment, the voice user interface 108 may convert the user's voice to text. In step 503, embodiments of the computing device 100 may analyze or otherwise compare or authorize the converted voice communication or computer readable data to authenticate the voice signature of the user. For instance, an authentication system 240 stored on the local storage medium 105 may authenticate or otherwise ensure that the person providing the voice communication or command is authorized to make a voice command to the computing device. Embodiments of the authentication system 240 may compare the analyzed or received converted voice signature of the voice communication with a database 230 containing authorized voice signatures. If the voice signature matches one of the authorized signatures in the database 230, then the computing device 100 may proceed to the next step. Various methods for comparing the voice signature with a database 230 of voice signatures may be used, including searching unique identifiers, fingerprints, sample voice signature data, and the like. In step 504, the computing device 100 may transmit the computer readable data (i.e. the content of the message) to a separate computing device 401, 402, 403 over a network 7 if the voice signature is authenticated by the authentication system 240 in step 503.

Figure 5:
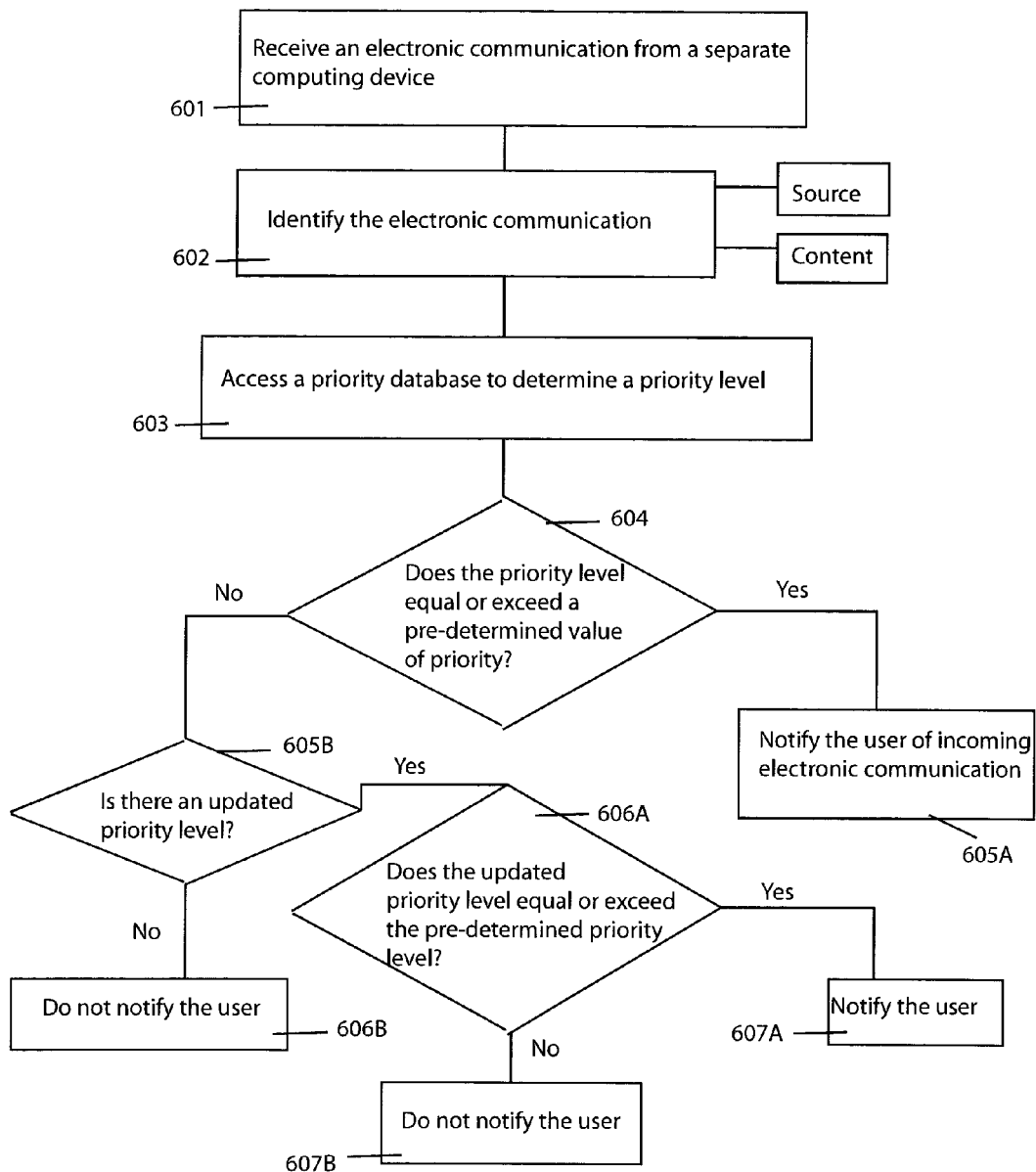
FIG. 5 depicts a flowchart of an embodiment of a computing device implementing steps to authenticate a user's voice signature for providing voice commands.

Referring still to the drawings, FIG. 5 depicts an embodiment of a computing device/system 100 that may selectively notify the user of an incoming electronic communication from a separate computing device 401 based on a level of priority set by the user. In step 601, embodiments of the computing device 100 may receive an electronic communication from a separate computing device, such as devices 401, 402, 403. For example, a user's cellular phone may receive a text message or a phone call from an acquaintance operating their cellular phone. In step 602, embodiments of the computing device 100 may identify the electronic communication. Embodiments of the computing device 100 may include an identification system 210 stored in a local storage medium 105 that may identify the electronic communication received by the computing device 100. For instance, when the electronic communication is received, the identification system 210 may determine and identify a source, a geographic location, a cellular phone number, a unique identifier, an identity, such as a known contact or available name, and other various characteristics of the electronic communication. In addition, the identification system 210 may parse the content of the incoming message, such as the text of a text message. Those having skill in the art should appreciate that various methods may be employed to identify the content, characteristics and other identifying information of the received electronic signal/communication. In step 603, once the electronic communication has been identified, embodiments of the computing device 100 may access a priority database 220 stored on a local storage medium 105 of the computing device 100 to determine a priority level. Embodiments of the priority database 220 may store a priority level for known contacts, preprogrammed contacts, unknown contacts, specific content or keywords contained within incoming messages (e.g. emergency indications such as "911" or "help"), and the like. These priority levels may be input by the user via the I/O device 119 of the computing device 100. Further, the priority levels contained in the priority database 230 may be changed at any time, and may be set to change if a given event or condition occurs. For example, between midnight and 8 o'clock AM, a priority level for some specific contacts may be reduced. Priority levels may be measured in integers, such as 1-10, 1-100, or may be measured by other values according to specific algorithms to establish a value of a priority level. In step 604, the computing system 100 determines whether the determined priority level is equal to or exceeds a pre-determined priority level set by the user or a default priority level. Embodiments of a pre-determined priority level may be a value set by the user that may filter the amount or the content of any electronic communications. If the determined priority level equals or exceeds the pre-determined priority level, then the computing system may notify the user of the incoming electronic communication, as shown in step 605A. For instance, the user may be notified by displaying (e.g. display text, flashing screen) or audibly notifying (e.g. ringing) the user of the electronic communication. The user may give a voice command to the voice user interface 108 as explained above to perform a desired action. If the determined priority level is below the pre-determined priority level, then the computing device 100 may determine if there is an updated priority level, as shown in step 605B. If no updated priority can be found, then the user may not be notified, as shown in step 606B. Embodiments of an updated priority level may be the pre-set priority level contained within the priority database 230 that may be updated after the computing system 100 parses the electronic communication for particular content. For example, if the user wants to be notified if he or she receives an electronic communication regarding offers to buy a house that is up for sale, but does not want to increase a general pre-determined priority level, the computing system 100 can parse the electronic communication for text or computer readable data regarding the offer to buy the house. In the event that an incoming message does contain the specific content, the priority level may be increased or otherwise changed so that the value may equal or exceed the predetermined priority level, as shown in step 606A. Therefore, the user may be notified, as shown in step 607A. Even if the updated priority level is increased or otherwise changed, but still does not equal or exceed the pre-determined priority level, then user is not notified, as shown in step 607B. Alternatively, the updated priority level may be used to decrease or otherwise change the priority level. For example, if the user determines that he or she does not want to be notified of an incoming message that refers to specific content such as a recent conference call, but the incoming electronic communication has a priority level that equals or exceed the pre-determined priority level, the updated priority level may be decreased or changed so that the user is not notified.

Referring now to FIGS. 1-5, embodiments of a processor 103 of a computing device/system 100 may execute or implement steps according to software loaded in its memory 105. Embodiments of the software may be any set of machine readable instructions which may direct the processor 103 of the computing device/system 100 to perform one or more specific operations. In alternative embodiments, the software may be a source code, binary code or a combination thereof. In some embodiments, the software may be in the form of application software. As seen in the exemplary embodiment depicted in FIG. 1, the software may be loaded into the computer readable memory 105 of the computing system 100. In alternative embodiments, the software may be embedded software which may reside in the firmware of embedded systems.

Embodiments of the computing device 100 executing the steps of software may authenticate, prioritize, and/or analyze incoming communication from both a first user and electronic data coming from a second user. Moreover, embodiments of the computing system 10 may also covert voice signals from a user to computer readable data, such as text for transmitting to a second electronic device, such as an electronic device operated by the second user. Embodiments of an electronic communication from a separate computing device or system 401, 402, 403 may be a SMS message, a MMS message, a text message, an email, a radio link, a signal from the Internet, a satellite communication, a signal sent over a cellular network, Wi-Fi network, or Bluetooth® network, or any communication using an electrical signal or electromagnetic waves.

Embodiments of computing system 100 running the software described herein may execute or implement the steps of receiving, by a processor 103 of the computing device 100, an electronic communication from a separate computing device 401, identifying, by the processor 103, the electronic communication received from the separate computing device 401, notifying, by the processor 103, the identified information of the electronic communication, receiving, through a voice user interface 108 coupled to the processor 103, a voice communication from a first user in response to the notifying of the identified information, without a physical interaction with the computing device, and determining, by the processor 103, an action based on the voice communication. Further embodiments of the computing device 100 running software may execute or implement the steps of receiving, by a processor 103 of a computing device 100, an electronic communication from a separate computing device 401, identifying, by the processor 103, the electronic communication received from the separate computing device 401, accessing, by the processor 103, a priority database 230 to determine a priority level specific to a source of the identified information, in response to receiving the electronic communication from the separate computing system 401, wherein, if the priority level equals or exceeds a pre-determined value, a user may be notified by the processor 103 that the electronic communication is being received, and wherein, if the priority level is below the pre-determined value, the user may not notified that the electronic communication is being received from the separate computing device 401.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the invention, as required by the following claims. The claims provide the scope of the coverage of the invention and should not be limited to the specific examples provided herein.

The claims are as follows:

1. A computing device comprising:
   a receiver coupled to a processor for receiving an electronic communication from a separate computing device;
   a local storage medium coupled to the processor, the local storage medium storing an identification system for identifying the electronic communication received from the separate computing device, wherein the processor notifies a user of the identified information of the electronic communication; and
   a voice user interface coupled to the processor for receiving a voice communication from the user in response to the notifying of the identified information, without a physical interaction between the user and the computing device, wherein the voice user interface continuously collects and processes audio starting at a point before the receiver receives the electronic communication from the separate computing device, and prior to a live communication channel being established, until the voice communication is received from the user;
   wherein the processor determines a desired action based on the voice communication from a plurality of desired actions available to the user.

2. The computing device of claim 1, wherein notifying the user includes at least one of displaying the identified information on a display of the computing device, and audibly notifying the user through one or more speakers of the computing system.

3. The computing device of claim 1, wherein the electronic communication is at least one of a SMS message, a MMS message, and a phone call over a cellular network.

4. The computing device of claim 1, wherein the action determined by the processor includes establishing a live communication channel between the computing device and the separate computing device, and denying the live communication channel between the computing device and the separate computing device.

5. The computing device of claim 1, wherein the computing device and the separate computing device is a cellular phone.

6. A method comprising:
   receiving, by a processor of the computing device, an electronic communication from a separate computing device;
   identifying, by the processor, the electronic communication received from the separate computing device;
   notifying, by the processor, the identified information of the electronic communication;
   receiving, through a voice user interface coupled to the processor, a voice communication from a first user in response to the notifying of the identified information, without a physical interaction with the computing device, wherein the voice user interface continuously collects and processes audio starting at a point before the receiver receives the electronic communication from the separate computing device and prior to a live communication channel being established, until the voice communication is received from the user; and
   determining, by the processor, a desired action based on the voice communication from a plurality of desired actions available to the user.

7. The method of claim 6, wherein the electronic communication is at least one of a SMS message, a MMS message, and a telephone call over a cellular network.

8. The method of claim 6, wherein the action determined by the processor includes establishing a live communication channel between the computing device and the separate computing device, and denying the live communication channel between the computing device and the separate computing device.

9. The method of claim 6, wherein the computing device and the separate computing device is a cellular phone.

10. The method of claim 6, wherein the step of notifying the user includes at least one of displaying the identified information on a display of the computing device, and audibly notifying the user through one or more speakers of the computing device.

* * * * *